US011557912B2

(12) United States Patent
Chan et al.

(10) Patent No.: US 11,557,912 B2
(45) Date of Patent: Jan. 17, 2023

(54) SYSTEM AND METHOD FOR ENERGY STORAGE AND POWER SUPPLY

(71) Applicant: Quanta Computer Inc., Taoyuan (TW)

(72) Inventors: Tsung-Lin Chan, Taoyuan (TW); Tai-Hsin Chu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 210 days.

(21) Appl. No.: 17/031,028

(22) Filed: Sep. 24, 2020

(65) Prior Publication Data
US 2021/0313825 A1   Oct. 7, 2021

(30) Foreign Application Priority Data

Apr. 1, 2020 (TW) ................................ 109111113

(51) Int. Cl.
*H02J 7/00* (2006.01)
*H02J 7/14* (2006.01)
*B60L 58/12* (2019.01)
*B60L 58/18* (2019.01)
*B60L 50/61* (2019.01)
*B60L 3/10* (2006.01)

(52) U.S. Cl.
CPC ............ *H02J 7/1446* (2013.01); *B60L 58/12* (2019.02); *B60L 58/18* (2019.02); *H02J 7/1423* (2013.01); *B60L 3/104* (2013.01); *B60L 50/61* (2019.02)

(58) Field of Classification Search
CPC ....... H02J 7/1423; H02J 7/1446; B60L 58/12; B60L 58/18; B60L 3/104; B60L 50/61
USPC ............................................. 320/109; 701/22
See application file for complete search history.

(56) References Cited

U.S. PATENT DOCUMENTS

2008/0133136 A1* 6/2008 Breed ................... G05D 1/0274
340/901
2015/0280467 A1* 10/2015 Matsuda .............. B62K 25/283
307/10.1

FOREIGN PATENT DOCUMENTS

CN      106585404 A  *  4/2017
TW      106585404 A     4/2017

OTHER PUBLICATIONS

Chinese language office action dated Nov. 19, 2020, issued in application No. TW 109111113.

* cited by examiner

*Primary Examiner* — Zixuan Zhou
(74) *Attorney, Agent, or Firm* — McClure, Qualey & Rodack, LLP

(57) ABSTRACT

An energy and supply system includes a switching device, a battery detection device, a speed detection device, a processing device, a main storage battery and a backup storage battery. Using the speed detection device, the processing device determines whether the driving speed of the vehicle exceeds a preset speed threshold, or it determines whether the rotation speed of the engine exceeds a preset rotation speed. The processing device uses the battery detection device to determine whether the main battery capacity is greater than the preset capacity. If the processing device determines that the driving speed of the vehicle exceeds a preset speed threshold, or it determines that the rotation speed of the engine exceeds a preset rotation speed, and it determines that the main battery capacity is greater than the preset capacity, the processing device controls the switching device.

5 Claims, 2 Drawing Sheets

SYSTEM AND METHOD FOR ENERGY STORAGE AND POWER SUPPLY

CROSS REFERENCE TO RELATED APPLICATIONS

This Applications claims priority of Taiwan Patent Application No. 109111113, filed on Apr. 1, 2020, the entirety of which is incorporated by reference herein.

BACKGROUND OF THE INVENTION

Field of the Invention

The present disclosure generally relates to an energy storage and power supply system, and more particularly, to an energy storage and power supply system which charges a main storage battery and a backup storage battery respectively.

Description of the Related Art

As consumers' environmental awareness continuously increases, sales volume of electric cars will increase. To improve the endurance of electric cars, how to improve convenience in charging batteries has become an important issue.

In traditional technology, to extend endurance of electric cars, it is normal to charge batteries or swap batteries via charging stations. However, in order to improve the convenience of charging or swapping batteries, more locations are needed to set up more charging stations. In this way, setting up charging stations not only occupies a lot of public space, but also has disadvantages such as increasing the cost of setting up charging stations, and so on. Furthermore, since the locations of the charge stations are generally fixed, electric cars should drive to the charging stations to charge or swap batteries.

In order to overcome the shortcomings of charging stations mentioned above, the present disclosure presents the use of an energy storage and power supply system of petrol cars to charge the batteries of electric cars.

BRIEF SUMMARY OF THE INVENTION

An energy storage and power supply system is set up in a vehicle. The energy storage and power supply system includes: a switching device, a battery detection device, a speed detection device, a processing device, a main storage battery, and a backup storage battery. The switching device is connected to a power generation device of the vehicle, the main storage battery and the backup storage battery. The battery detection device detects main battery capacity of the main storage battery. The speed detection device detects the driving speed of the vehicle, or the rotation speed of the engine of the vehicle. The processing device determines if the driving speed of the vehicle exceeds a preset speed threshold, or if the rotation speed of the engine exceeds a preset rotation speed, via the speed detection device. The processing device determines if the capacity of the main storage battery is greater than a preset capacity. If the processing device determines that the driving speed exceeds the preset speed threshold, or the rotation speed exceeds the preset rotation speed, and it determines that the capacity of the main battery is greater than the preset capacity, the processing device will control the switching device to make the power generation device of the vehicle charge the backup storage battery.

DETAILED DESCRIPTION OF THE INVENTION

The following description is made for the purpose of illustrating the general principles of the invention and should not be taken in a limiting sense. The scope of the invention is best determined by reference to the appended claims.

The drawings are referenced to describe the present disclosure, wherein same reference numbers and symbols in the various drawings indicate similar or equivalent elements. The drawings are not depicted in proportion, and is merely used to explain the present disclosure. Several forms of the present disclosure is described below, referring to example applications as explanation. It is to be understood that many specific details, relations and methods had been set forth herein to offer a comprehensive understanding of the present disclosure. However, the persons of ordinary skill in the art will readily appreciate that the present disclosure could be implement even without one or more specific details or without using other methods to implement the present disclosure. Under other conditions, known structures or operations are not shown to avoid ambiguity of the present disclosure. The present disclosure is not limited by the shown order of the operations or events, since some operations could happen in different order or/and happen with other operations simultaneously. Furthermore, it is not necessary to implement all of the operations or events base on the methods of the present disclosure.

The following illustrations are embodiments of the present disclosure, which is to give some examples of general principles of the present disclosure, and should not be regarded as the limitations of the present disclosure. The scope of the invention is defined by the claims.

Figure 1:
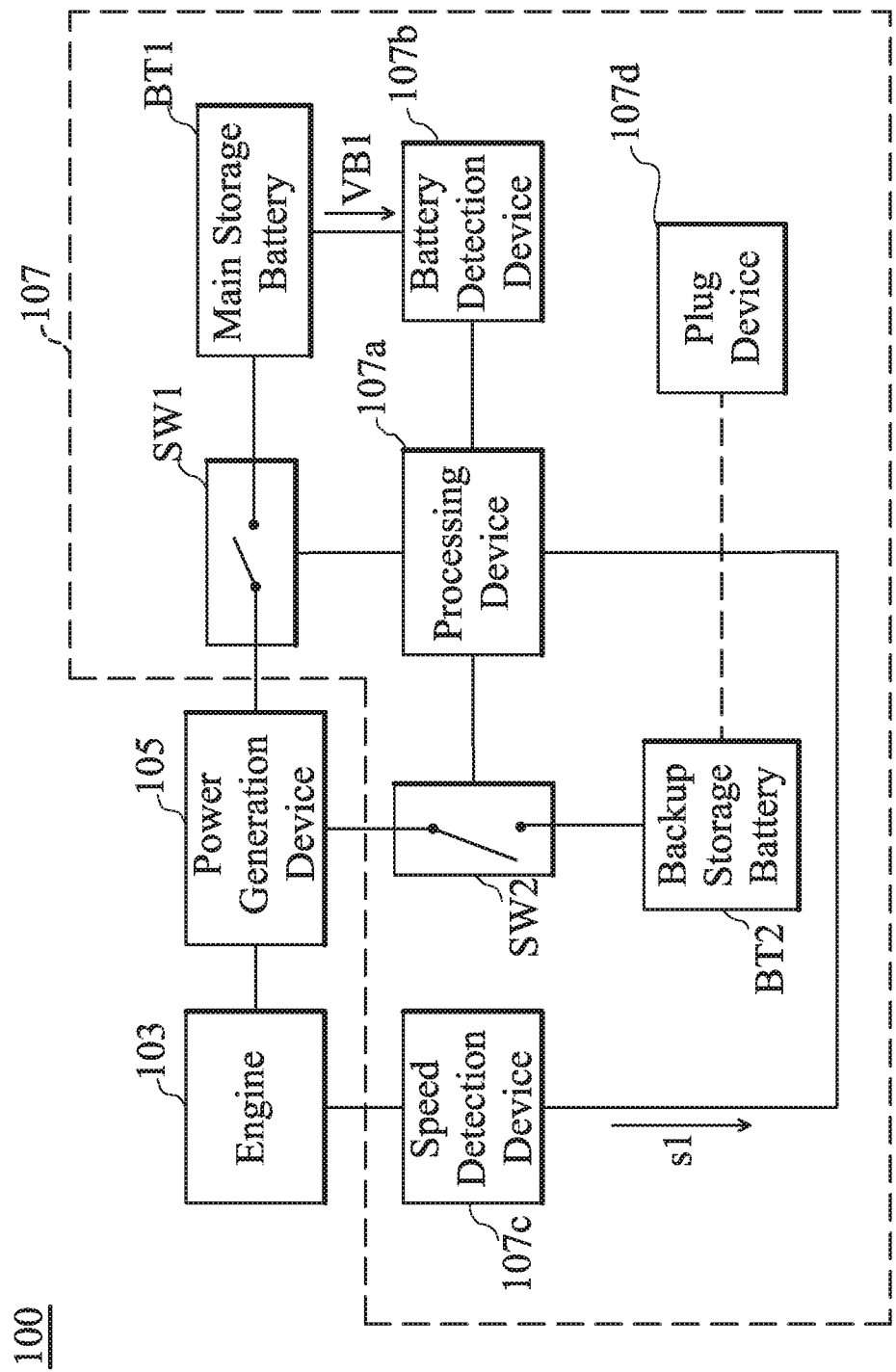
FIG. 1 shows a block diagram of an energy storage and power supply system according to an embodiment of the present disclosure.

FIG. 1 shows a block diagram of an energy storage and power supply system 107 according to an embodiment of the present disclosure. As FIG. 1 indicated, a vehicle 100 comprises: an engine 103, a power generation device (such as: generator) 105, and an energy storage and power supply system 107. In some embodiments, the vehicle 100 can be a general gasoline automobile, but the present disclosure is not limited to it. In addition, the energy storage and power supply system 107 includes: a switching device (including: a switch SW1 and a switch SW2), a battery detection device 107b, a speed detection device 107c, a processing device 107a, a main storage battery BT1, and a backup storage battery BT2. The processing device can be selected from a CPU (Central Processing Unit), a microcontroller, an embedded processor, and so on, to load and execute program codes to carry out the functions described hereinafter, but the present disclosure is not limited to it.

As shown in FIG. 1, the switching device (including: the switches SW1 and SW2) is connected to the power generation device 105 of the vehicle 100, the main storage battery BT1 and the backup storage battery BT2, wherein the power generation device 105 is connected to the switch SW1 and the switch SW2. The switch SW1 is connected to the main storage battery BT1. The switch SW2 is connected to the backup storage battery BT2. The processing device 107a is connected to the battery detection device 107b and the speed detection device 107c. The processing device 107a is also connected to the switch SW1 and the switch SW2, in order to control the switch SW1 and the switch SW2 turned-on or turned-off, respectively.

As mentioned above, the battery detection device 107b is configured to detect the main battery capacity of the main storage battery BT1. In some embodiments, the battery detection device 107b measures the voltage VB1 of the main storage battery BT1 for the processing device 107a. When the processing device 107a receives the voltage VB1, the processing device 107a calculates the main battery capacity of the main battery BT1, which is regarded as the residual voltage of the main battery BT1, according to the magnitude of the voltage VB1. In some embodiments, the present disclosure can indicate the residual voltage of the storage battery by the relative state of charge (RSOC) of the storage battery, but the present disclosure is not limited to it. It is a common knowledge in the art that the RSOC can be used to define the residual voltage of the storage battery. The RSOC is generally expressed as a percentage, and the range of the RSOC is generally 0100%. When the storage battery is completely charged, the RSOC is 100%. When the storage battery is completely discharged, RSOC is 0%.

Then, the speed detection device 107c is configured to detect driving speed of the vehicle 100 to send a speed signal s1 to the processing device 107a. The processing device 107a determines the current driving speed of the vehicle 100 according to the speed signal.

In some embodiments, the speed detection device 107c includes: a Global Positioning System (GPS), a gravity sensor (G-sensor), a gyroscope, and an array microphone, wherein the G-sensor is used to determine the acceleration of the vehicle 100, and the gyroscope is used to determine the diversion of the vehicle 100, and the array microphone is used to sample the position and calibrate the sound frequency of the vehicle. Combining the above GPS, G-sensor, gyroscope, and array microphone, the speed detection device 107c can acquire the driving speed of the vehicle 100. But the present disclosure is not limited to it.

In some other embodiments, or, the speed detection device 107c is also configured to detect the rotation speed of the engine 103 of the vehicle 100 to output the speed signal s1 to the processing device 107a. The processing device 107a can determine the current rotation speed of the engine 103 of the vehicle 100 according to the speed signal s1. For example, the speed detection device 107c can be a tachometer, and the tachometer can be used to determine and display the rotation speed of the engine 103, but the present disclosure is not limited to it.

In some embodiments, electronic devices on the general petrol (gasoline) car (e.g. the vehicle 100) can be a battery (e.g. the main storage battery BT1 in FIG. 1), an ignition device, a starting device, a lighting device, a metering device, a heating and cooling device, an audio device, a power generation device (e.g. the power generation device 105), and so on. The electricity for these electronic devices is mainly provided by the main storage batter BT1 and the power generation device 105. In addition, in some embodiments, the backup storage battery BT2 in FIG. 1 can be the storage battery of an electric car, but the present disclosure is not limited to it.

In some embodiments, the processing device 107a determines whether the driving speed of the vehicle 100 exceeds the preset speed threshold via the speed detection device 107c. Or, the processing device 107a determines whether the rotation speed of the engine 103 of the vehicle 100 exceeds the preset rotation speed.

Then, the processing device 107a measures the voltage VB1 by the battery detection device 107b to determine whether the main battery capacity is greater than the preset capacity. It should be noted that the preset speed threshold, preset rotation speed, and preset capacity mentioned in the present disclosure can be set up in the processing device 107a in various forms such as firmware, software, hardware, and so on, but the present disclosure is not limited to it.

First, if the processing device 107a determines the driving speed of the vehicle 100 exceeds a preset speed threshold, the processing device 107a will further determines whether the main battery capacity is greater than the preset capacity. Or, if the processing device 107a determines the rotation speed of the engine 103 of the vehicle 100 exceeds the preset rotation speed, the processing device 107a will further determines whether the main battery capacity is greater than the preset capacity. It should be noted that in this embodiment, persons of ordinary skill in the art will readily appreciate that when the engine 103 is operating, it drives the power generator 105 to operate via a belt. Therefore, no matter whether the driving speed of the vehicle 100 exceeds the preset speed threshold or no matter whether the rotation speed of the engine 103 of the vehicle exceeds the preset rotation speed, the power generation device 105 will operate along with the engine 103.

Then, if the processing device 107a determines that the main battery capacity is greater than the preset capacity, the processing device 107a will cut off the switch SW1 and turn on the switch SW2. Therefore, the power generation device 105 provides electricity to charge the backup storage battery BT2. If the processing device 107a determines that the main battery capacity is less than or equal to the preset capacity, the processing device 107a will turn on the switch SW1 and cut off the switch SW2. Therefore, the power generation device 105 provides electricity to charge the main storage battery BT1.

In addition, if the processing device 107a determines that the driving speed of the vehicle 100 is less than or equal to the preset speed threshold, the processing device 107a will turn on the switch SW1 and cut off the switch SW2 so that the electricity output by the power generator device 105 is provided to the main storage battery BT1. Or, if the processing device 107a determines that the rotation speed of the engine 103 of the vehicle 100 is less than or equal to the preset rotation speed, the processing device 107a will turn on the switch SW1 and cut off the switch SW2 so that the electricity output by the power generation device 105 is provided to the main storage battery BT1. In other words, when the (driving) speed of the vehicle 100 is low or when the rotation speed of the engine 103 is low, the main storage battery BT1 is charged such that the main storage battery will not runs out electricity due to long-time driving of the vehicle 100 in low speed.

In some other embodiments, the energy storage and power supply system 100 further includes a plug device 107d. When the plug device 107d is connected to external electronic devices, the backup storage battery BT2 will provide electricity for the external electrical devices. For example, when the plug device 107d is connected to an electric motorcycle, the backup storage battery BT2 can charge the storage battery of the electric motorcycle.

Figure 2:
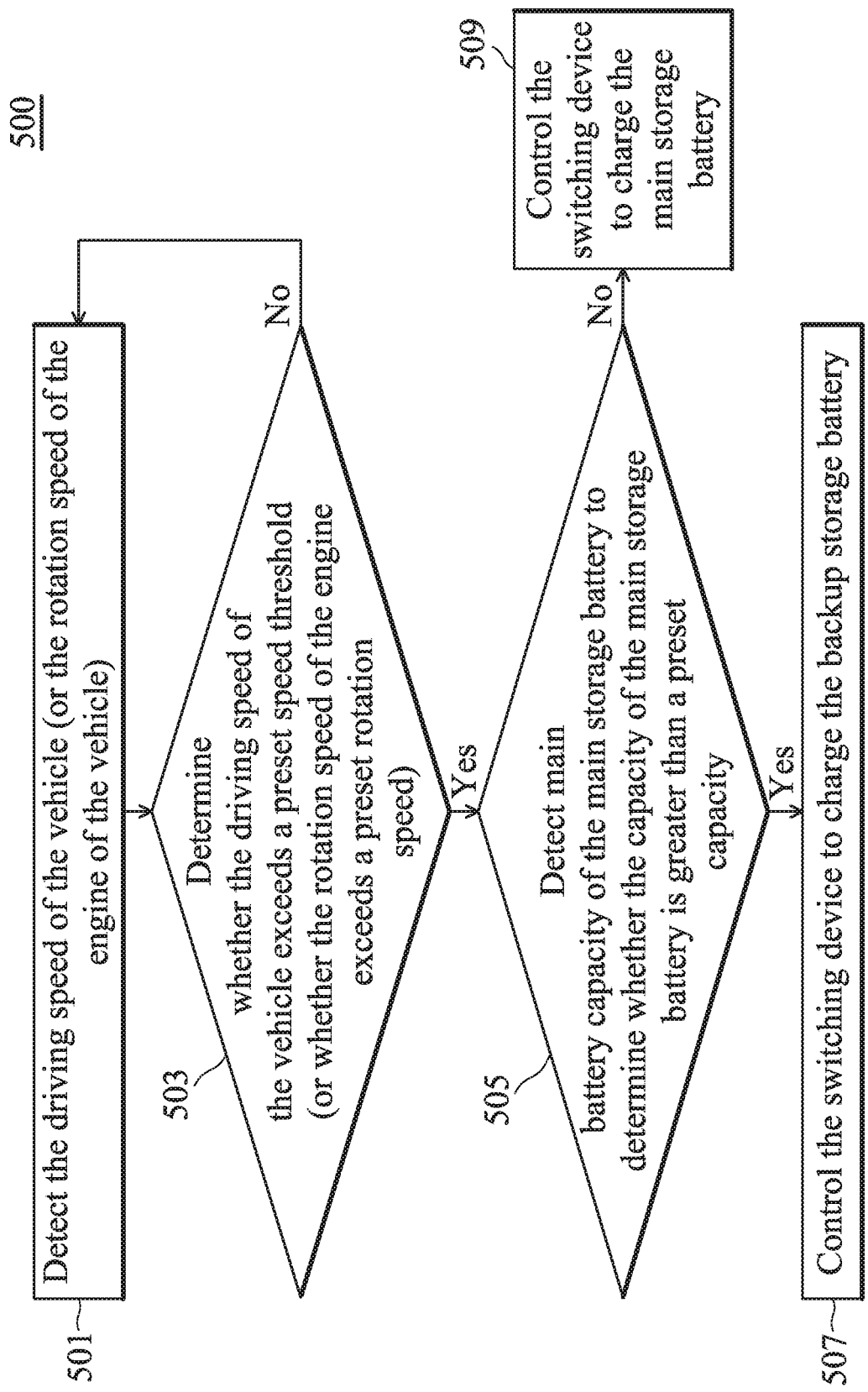
FIG. 2 shows a flow chart of an energy storage and power supply method according to an embodiment of the present disclosure.

FIG. 2 shows a flow chart of a method 500 for energy storage and power supplying according to an embodiment of the present disclosure. Please refer to FIG. 1 and FIG. 2. The method 500 for energy storage and power supply is executed by an energy storage and power supply system 107, and the operations of the energy storage and power supply system 107 starts from step 501.

In step 501, the speed detection device 107c in the energy storage and power supply system 100 is configured to detect the driving speed of the vehicle 100. Or, the speed detection device 107c is also configured to detect the rotation speed of the engine 103 of the vehicle 100.

In step 503, the processing device 107a determines whether the driving speed of the vehicle 100 exceeds a preset speed threshold via the speed detection device 107c. Or, the processing device 107a determines whether the rotation speed of the engine 103 of the vehicle 100 exceeds a preset rotation speed via the speed detection device 107c. If the driving speed of the vehicle 100 is not greater than the preset speed threshold or the rotation speed of the engine 103 is not greater than the preset rotation speed, the energy storage and power supply system 100 will repeat executing step 501.

On the contrary, if the driving speed of the vehicle 100 exceeds the preset speed threshold or the rotation speed of the engine 100 exceeds the preset rotation speed, the energy storage and power supply system 100 will continue to execute step 505.

In step 505, the processing device 107a acquires the main battery capacity of the main storage battery BT1 by the battery detection device 107b. In some embodiments, the battery detection device 107b determines the voltage VB1 of the main storage battery BT1 and sends to the processing device 107a, and the processing device 107a calculates the main battery capacity of the main storage battery BT1 according to the voltage VB1. Then, the processing device 107a determines whether the main battery capacity is greater than the preset capacity.

As mentioned above, if the processing device 107a determines that the main battery capacity is greater than the preset capacity, it will perform step 507. In step 507, the processing device 107a controls the switches (cut off the switch SW1 and turn on the switch SW2) so that the power generation device 105 charges the backup storage battery BT2.

As mentioned above, if the processing device 107a determines that the main battery capacity is not greater than the preset capacity, it will perform step 509. In step 509, the processing device 107a controls the switches (turn on the switch SW1 and cut off the switch SW2) so that the power generation device 105 charges the main storage battery BT1.

In some embodiments, the backup storage battery BT2 and the main storage battery BT1 can be selected from Lead-acid battery, Nickel-cadmium battery, NiMH battery, Nickel-zinc battery, Lithium battery, Carbon-zinc battery, Aluminum battery, and so on, but the present disclosure is not limited to it.

In summary, the energy storage and power supply system 100 of the present disclosure can provide a more convenient way for charging electric cars or electric motorcycles, making drivers of electric cars (electrical motorcycles) more convenient to perform storage battery swapping or storage battery charging in the future.

Despite the preferable embodiments of the present disclosure disclosed above, the embodiments are not intended to limit the following claims. Persons of ordinary skill in the art can arrange various modifications or alternatives within the spirit and scope of the invention. Therefore, the protected scope of the present disclosure should be regarded according to the following appended claims.

Terms used herein are merely for describing specific embodiment, and are not intended to limit the invention. The singular forms "a", "an", and "the" are intended to include the plural forms as well, unless the context clearly indicates otherwise. Furthermore, to the extent that the terms "including", "includes", "having", "has", "with", or variants thereof, are used in either the detailed description and/or the claims, such terms are intended to be inclusive in a manner similar to the term "comprising".

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An energy storage and power supply system, arranged in a vehicle, comprising:
    a main storage battery and a backup storage battery;
    a switch device, connected to a power generation device of the vehicle, the main storage battery and the backup storage battery;
    a battery detection device, configured to detect a main battery capacity of the main storage battery;
    a speed detection device, configured to detect a driving speed of the vehicle, or detect a rotation speed of an engine of the vehicle;
    a plug device, wherein the backup storage battery provides electricity to an external electrical device when the plug device is connected to the external electrical device; and
    a processing device, configured to perform the following tasks:
    determine whether the driving speed of the vehicle exceeds a preset speed threshold, or whether the rotation speed of the engine exceeds a preset rotation speed using the speed detection device; and
    determine whether the main battery capacity is greater than a preset capacity using the battery detection device;
    wherein in response to the processing device determining that the driving speed is less than the preset speed threshold, or the rotation speed is less than the preset rotation speed, the processing device controls the switch device to cause the power generation device of the vehicle charge the main storage battery;
    wherein in response to the processing device determining that the driving speed exceeds the preset speed threshold, or the rotation speed exceeds the preset rotation speed, and determining that the main battery capacity is greater than the preset capacity, the processing device controls the switch device to let the power generation device of the vehicle charge the backup storage battery.

2. The system of claim 1, wherein if the processing device determines that the driving speed exceeds the preset speed threshold, or determines that the rotation speed exceeds the preset rotation speed, and determines that the main battery capacity is less than or equal to the preset capacity, the processing device controls the switch device to let the power generation device charge the main storage battery.

3. The system of claim 1, wherein the speed detection device comprises a gravity sensor, a gyroscope, and an array microphone.

4. A method for energy storage and power supply, performed by an energy storage and power supply system having a main battery, a backup storage battery, a switch device, a battery detection device, a speed detection device and a processing device, the method comprising:
- detecting a main battery capacity of the main storage battery using the battery detection device;
- detecting a driving speed of the vehicle, or detecting a rotation speed of the engine of the vehicle using the speed detection device;
- providing electricity from the backup storage battery to an external electrical device when a plug device is connected to the external electrical device from the energy storage and power supply system; and
- determining whether the driving speed of the vehicle exceeds a preset speed threshold, or determining whether the rotation speed of the engine exceeds a preset rotation speed using the processing device and the speed detection device;
- wherein in response to the processing device determining that the driving speed is less than the preset speed threshold, or the rotation speed is less than the preset rotation speed, the processing device controls the switch device to cause the power generation device of the vehicle charge the main storage battery;
- wherein in response to the processing device determining that the driving speed exceeds the preset speed threshold or the rotation speed exceeds the preset rotation speed, and determining that the main battery capacity is greater than a preset capacity, the processing device will control the switch to let the power generation device charge the backup storage battery.

5. The method of claim 4, wherein if the processing device determines that the driving speed exceeds the preset speed threshold or the rotation speed exceeds the preset rotation speed, and determines that the main battery capacity is less than or equal to a preset capacity, the processing device controls the switch to let the power generation device charge the main storage battery.

\* \* \* \* \*